US011765087B1

(12) United States Patent
Balmakhtar et al.

(10) Patent No.: US 11,765,087 B1
(45) Date of Patent: Sep. 19, 2023

(54) RAPID PACKET PROCESSING AT USER PLANE FUNCTION (71) Applicant: T-Mobile Innovations LLC, Overland Park, KS (US)

(72) Inventors: Marouane Balmakhtar, Fairfax, VA (US); Brian Waters, Angel Fire, NM (US)

(73) Assignee: T-Mobile Innovations LLC, Overland Park, KS (US)

(*) Notice: Subject to any disclaimer, the term of this patent is extended or adjusted under 35 U.S.C. 154(b) by 106 days.

(21) Appl. No.: 17/406,410

(22) Filed: Aug. 19, 2021

(51) Int. Cl.
*H04L 45/7453* (2022.01)
*H04L 12/46* (2006.01)
*H04L 69/22* (2022.01)

(52) U.S. Cl.
CPC ...... *H04L 45/7453* (2013.01); *H04L 12/4633* (2013.01); *H04L 69/22* (2013.01)

(58) Field of Classification Search
CPC .. H04L 45/7453; H04L 12/4633; H04L 69/22
See application file for complete search history.

(56) References Cited

U.S. PATENT DOCUMENTS

| 2019/0053117 | A1* | 2/2019 | Bae | H04W 76/30 |
| 2019/0335002 | A1* | 10/2019 | Bogineni | H04W 48/16 |
| 2020/0059992 | A1* | 2/2020 | Skog | H04L 45/38 |
| 2020/0259896 | A1* | 8/2020 | Sachs | H04L 67/10 |
| 2020/0288480 | A1* | 9/2020 | Kim | H04W 72/563 |
| 2020/0336321 | A1* | 10/2020 | Ding | H04M 15/852 |
| 2021/0219238 | A1* | 7/2021 | Sharma | H04W 36/0083 |
| 2021/0281664 | A1* | 9/2021 | Suryanarayanarao | H04M 15/66 |
| 2021/0320988 | A1* | 10/2021 | Zhang | H04W 40/24 |
| 2022/0303201 | A1* | 9/2022 | Alvarez Dominguez | H04L 45/38 |
| 2022/0329534 | A1* | 10/2022 | Mui | H04L 47/2483 |

FOREIGN PATENT DOCUMENTS

| WO | 2021/018406 A1 | 2/2021 |
| WO | 2021/070086 A1 | 4/2021 |

* cited by examiner

Primary Examiner — Kent Krueger
(74) Attorney, Agent, or Firm — Jones Robb, PLLC (57) ABSTRACT Programmable networking devices configured to perform various packet processing functions for packet filtration, control and user plane separation (CUPS), user plane function (UPF), pipeline processing, etc. Upon arrival of a user plane packet, a UPF performs a rapid lookup or hash table of the provisioned PDRs associated with a given PFCP session, arrange PDRs in decreasing order of precedence, and process the packet more efficiently than evaluating all PDRs.

20 Claims, 7 Drawing Sheets

RAPID PACKET PROCESSING AT USER PLANE FUNCTION

TECHNICAL BACKGROUND

As communication networks evolve and grow, there are ongoing challenges in communicating data across different types of networks. Different types of networks can include wireless networks, packet-switched networks such as the internet, satellite networks, public/private networks, local area networks (LANs), wide area networks (WANs), and any network enabling communication between different types of electronic devices. Other types of communication networks in various combinations may be envisioned by those having ordinary skill in the art in light of this disclosure. One type of communication network described herein includes telecommunications networks, such as 5G New Radio (NR) networks, 4G LTE networks, etc. Such networks utilize specialized devices, such as gateways, routers, switches, etc. that enable communication between sub-network types, such as radio access networks (RANs), core networks, and so on, as further described herein. Further, data in the order of billions of packets per second traverses modern networks, thus requiring robust packet processing mechanisms that cause excessive signaling between the control and user planes, particularly as it relates to core networks, such as the 5G core network.

4G networks utilized various specialized serving and packet gateways as interfaces for controller nodes to communicate with user-plane nodes (e.g., S-GW and P-GW). A major effort of 5G networks includes control and user plane separation (CUPS) or, in other words, decouple session management from packet processing. 5G networks utilize various servers and functions that communicate over interfaces (e.g., session management function SMF and user plane function UPF devices communicating over N2, N3, N4, etc. reference points). However, these existing user plane functions (UPF in 5G, and user gateways in 4G) combine hardware components programmed strictly for packet processing (such as programmable network switches and devices) having very little processing dedicated towards "management" functions, and external servers or hosts for instructing the network switches how to process the data. Large amounts of data still have to traverse different network nodes in order to be properly routed to their destinations, resulting in extra communication between the switching hardware components and the external hosts/servers. The capacity limitations of existing user plane functions results in lower-than-optimal throughput, which is undesirable for operators of modern communication networks. Thus, there are limitations with existing implementations, particularly with regards to effectively processing large amounts of data and data sessions.

In particular, scaling issues exist because it requires managing different wireless device (e.g., UE) profiles while maintaining different rules per each UE's protocol data unit (PDU) session. For instance, a large number of applications and corresponding packet filters for packet detection could rapidly increase the size of the PDR lookup information for each Packet Forwarding Control Protocol (PFCP) session, that in turn increases the system resources (e.g., physical memory, cache usage) as the Packet Detection Rules (PDR) lookup becomes more and more complex. This architecture poses both an operational (provisioning) and a technical challenge (increased control plane traffic from the NEF/PCF and SMF for policy control) for mobile operators as the number of user sessions grow within a network. There is currently no method to efficiently evaluate the PDRs for all sessions.

In a specific example, a PFCP session lookup requires finding a session with a matching PDR by evaluating all packet detection information (PDI) for each PDR, for all sessions. An average session may include about 6 PDRs, thus for 2 million sessions, there would be 12 million PDR/PDI entries for both directions (uplink and downlink). For each direction, and assuming even distribution, there would be 6 million PDR/PDI entries for each direction that will need to be processed. Existing systems may be capable of running up to approximately 20 comparisons, where about 3,000,000 entries are processed per each comparison in a given direction (uplink or downlink). This would create serious bottlenecks since the incoming packets per second, and/or the associated UE rules/policies, will be very high in production network implementations.

Moreover, existing user plane function (UPF) packet processing architecture must evaluate all PDRs/PDIs, per the 3GPP specification. A challenge is optimizing millions of PDR/PDI entries that belong to different sessions. A large number of applications and corresponding packet filters for packet detection could rapidly engulf the size of the PDR lookup information for each Packet Forwarding Control Protocol (PFCP) session, which would consequently, impact CPU and memory consumption on the host system. The current architecture defined by the 3GPP specifications, poses serious challenge to mobile operators as the number of sessions that have to be looked up in a realistic scenario could be overwhelming for a sequential or even a parallel architecture.

OVERVIEW

Exemplary embodiments described herein include methods and programmable network devices for efficiently process data packets (e.g., user plane data packets) by providing targeted rapid lookups of processing rules (e.g., PDRs) without assessing too many PDRs during the process. In one example, a method for processing user-plane data packets includes receiving a data packet at a user plane function (UPF) via a first interface, based on the first interface, identifying a session associated with the data packet, identifying one or more packet data rules (PDRs) associated with the session, and processing the data packet per one of the PDRs based on a PDR precedence. One such example of a programmable networking device includes one or more embedded hardware devices configured with a host server (or just "host") enabling communication with other network devices on different interfaces including control and user interfaces. In an embodiment, the one or more embedded hardware devices can include field programmable gate arrays (FPGAs), graphics processing units (GPUs), etc. Such programmable networking devices can perform various functions including data session management, security/firewall, data processing, pre-processing, post-processing, pipeline processing, and data transport and switching functions. Further described herein are systems including such programmable networking devices, and methods executed by various components in such systems.

DETAILED DESCRIPTION

Example methods, systems, and network devices described herein can efficiently process data packets (e.g., user plane data packets) by providing targeted rapid lookups of processing rules (e.g., PDRs) without assessing too many PDRs during the process. Upon arrival of a user plane packet, a network node such as a user plane function (UPF) can perform a rapid lookup or hash table of the provisioned PDRs (i.e., PDRs associated with a given PFCP session), wherein the PDRs are arranged or listed in highest precedence with PDRs in decreasing order of precedence. The packet can then be processed (i.e., highest-precedence PDR applied) more efficiently than evaluating all PDRs stored on the network node. This addresses the aforementioned problems related to session growth/bloat, simplifying the complexity of scaling issues that could result from higher volumes of traffic, and improves the network's ability to handle and identify sessions amongst a significant number of sessions.

In examples described herein, an interface via which the packet is received (at, e.g., the UPF) is determined by parsing the packet. For example, an index-type lookup can be used to parse any metadata information, which can enable a lookup of a session and it's associated PDRs. For example, the metadata information can include different information elements that are also correlated with the different interfaces via with the data packets are received. The hash table type enables handling millions of entries associated with, for example, the different PFCP sessions. One particular example includes calculating the hash (an index into an array) which provides direct access with no overhead. For example, in the instance of a collision (i.e., a hash value appears more than once), the lookup and matching operations can be performed in parallel at an FPGA coupled to the UPF, to further optimize the overall process. This is again much more efficient than prior art methods that require sequentially processing packet rules.

In summary, a high-level classification can be performed on the session based on looking up the initial information available from parsing the metadata information. For instance, if a 'destination address' is a defined IP address on a UPF server, then it can be determined that the packet is a GTP packet. A look up based on tunnel endpoint identifier (TEID) or a fully-qualified tunnel endpoint identifier (FTEID) can be performed if the packet header indicates a GTP header. Whereas, if an IP address is not defined in the UPF server, a UE IP address can be determined. This is an example of how to first identify a session before evaluating other PDRs. Meanwhile, for a PDR to match a packet, other information elements can be considered, e.g., source interface type, local F-TEID, network instance, and so on. Further, each PDR can include all defined packet detection information (PDI) attributes that can be used to match with the data packet.

Therefore, a method for processing user-plane data packets described herein includes receiving a data packet at a user plane function (UPF) via a first interface, based on the first interface, identifying a session associated with the data packet, identifying one or more packet data rules (PDRs) associated with the session, and processing the data packet per the PDR with the highest precedence. The PDRs can be arranged or listed in order of priority based on a precedence. Identifying the first interface includes parsing the data packet for metadata information further described below. The session is identified via a rapid lookup or a hash table lookup. The hash table lookup comprises calculating a hash value. In the case of a collision, a parallel hash table lookup is performed. The rapid lookup comprises identifying the session based on one or more information elements (IEs).

In a specific example, the UPFs include programmable networking devices for processing data packets traversing one or more networks. The programmable network devices may be provided on a compact and modular hardware unit to minimize excessive communication while maintaining control and user plane separation (CUPS). The programmable networking device can include one or more processors, memories, and one or more embedded hardware chips, such as FPGAs, GPUs, ASICs, memory modules, and so on. In examples described herein, instructions for performing the method are written using high level synthesis (HLS). For example, a HLS compiler translates C++ code to a hardware description language (HDL), which can be integrated into traditional FPGA design tools and workflow. In exemplary embodiments described herein, one or more host modules on a memory coupled to a processor can interface between an FPGA programmed with UPF functionality and a control plane network node or gateway. Many diverse uses and implementations can be envisioned for the novel programmable networking devices described herein. Any situation that requires high-speed low-latency packet processing can benefit from these programmable networking devices. In further examples, the embedded hardware chips/devices can include one or more network interfaces, or interfaces for transmitting data to different network nodes or devices.

In an example embodiment further described in detail herein, such a programmable networking device can perform user plane functions on data packets traversing a mobile network, as well as packet filtration at network edges, deep-packet inspection (DPI), secure fast transfer of transmitting detailed instructions (for high-frequency stock trading, for example), and so on. Deploying the hosts and FPGA in a single (or modular) rack unit enables secure packet processing at line rate. Further, examples of programmable networking devices described herein can be positioned or located at various points within a network topology depending on a network operator's requirement. For example, the programmable networking devices can enhance or replace the myriad existing packet gateways, such as a CUPS based user plane S-GW, P-GW, or SAE-GW in 4G networks, and user plane functions (UPF) in 5G networks. In an exemplary embodiment, a programmable networking device as described herein can be co-located with an access node, such as a gNodeB or eNodeB, such that data flows may directly egress from the user plane at the radio access network (RAN) to the destination network. For example, the programmable networking device can replace a user plane or data plane elements of a system architecture evolution (SAE) gateway in 4G networks, or can replace an intermediate UPF (iUPF) in 5G networks. This eliminates having to transport the data packets to central sites or networks.

Figure 1A:
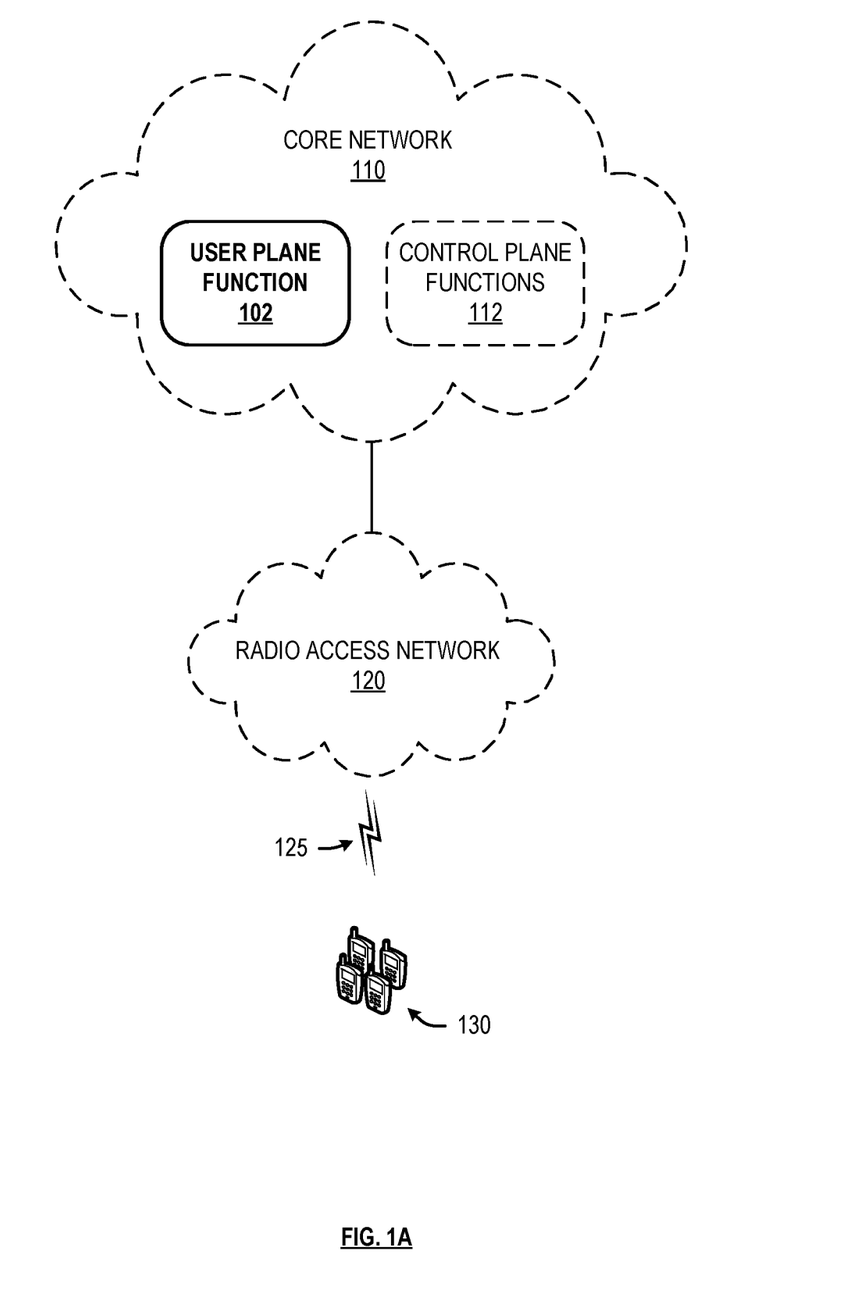
FIGS. 1A-1B depict an example system and UPF within the system.
Figure 1B:
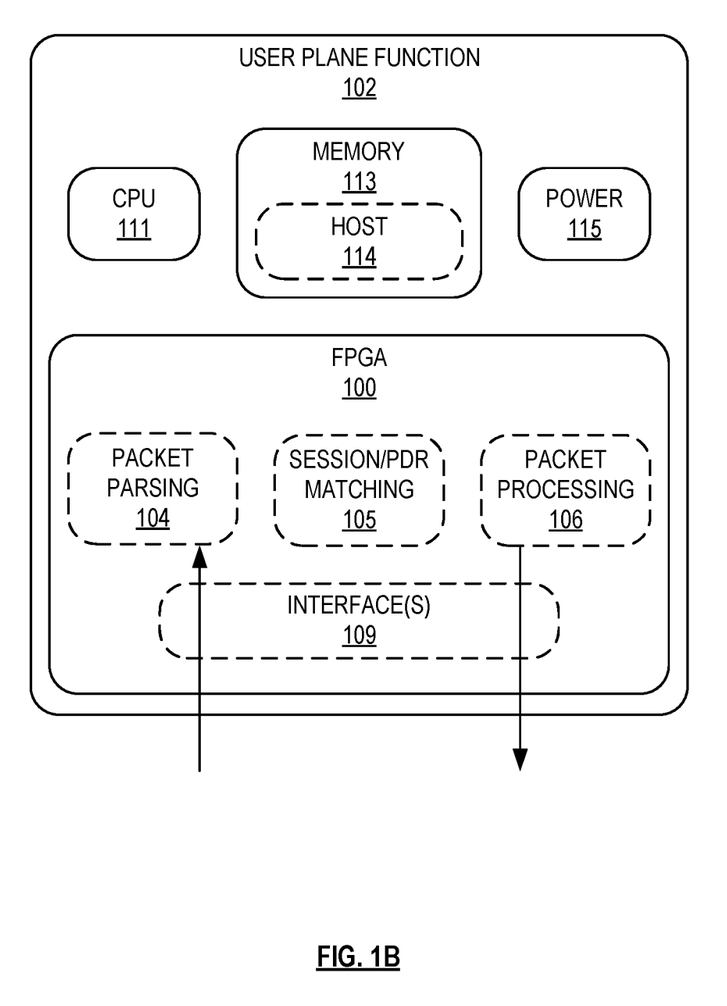

FIGS. 1A-1B respectively depict an example communication network and UPF 102 deployed therein. With reference to FIG. 1A, a user plane function 102 is illustrated as being within a core network 110 coupled to a radio access network (RAN) 120 that serves wireless devices 130 over communication links 125. For example, the wireless devices 130 can be end-user wireless devices (e.g., UEs), communication links 125 use 5G NR, 4G LTE, or any other suitable type of ratio access technology (RAT), and core network 110 can be structured using a service-based architecture (SBA) utilizing core network functions and elements, including user plane functions 102 and control plane functions 112. The RAN 120 can include various access network functions and devices disposed between the core network 110 and the end-user wireless devices 130. For example, the RAN 120 includes at least an access node (or base station), such as an eNodeB and/or a next generation NodeB (gNodeB) communicating with a plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) and capable of communicating signals and carrying data, for example, to support voice, push-to-talk, broadcast video, and data communications by end-user wireless devices 130.

UPF 102 and other positions within the illustrated network topology can include programmable network devices (and integrated circuits provided thereon) that enhance or replace the myriad existing packet gateways, such as a CUPS based user plane S-GW, P-GW, or SAE-GW in 4G networks, and user plane functions (UPF) in 5G networks. For example, UPF 102 can perform packet filtration at network edge of each network 110, 120, and deep-packet inspection (DPI) for packets traversing thereto/therefrom private networks, secure fast transfer of detailed instructions (for high-frequency stock trading, for example), and so on. This eliminates having to transport the data packets to central sites or networks, while providing robust and secure filtration of network edges. Further, incorporating packet processing and data session management functions into these programmable networking devices also minimizes the need for extra control plane elements and communication therebetween. Since it is beneficial to have the user plane co-located (or as close as network architecture allows) to the access node, and then directly egress from that user plane to the destination network, this configuration reduces or eliminates extraneous transport of data through the core network.

In one example, UPF 102 can include one or more programmable network devices with a plurality of network functions embedded thereon, including pipeline processing for processing data packets and sessions transmitted through core network 110, as well as rapid lookup, hash table, and rule (e.g., PDR) processing described herein. One such example of a programmable networking device includes one or more field programmable gate arrays (FPGAs) configured with a host server (or simply "host") enabling communication with other network devices on different interfaces including control and user interfaces. Such programmable networking devices can perform various functions including data session management, security/firewall, data processing, pre-processing, post-processing, pipeline processing, and data transport and switching functions. Other functions performed by an exemplary UPF 102 include communicating with other network components, such as a controller node, managing health of different network nodes such as eNodeBs, gNodeBs, other components of a UPF, or any network node along the data path, as well as tunnel identification management, session identifier management, receiving control-plane instructions from a session management function (SMF) in the case of 5G, and the SGW-C and PGW-C in the case of 4G, etc. Based on the instructions from the controller node, a host module of the programmable networking device can determine how to process the data sessions associated with the data packets it receives. The host module interacts with an embedded circuit such as an FPGA that is programmed to transmit and receive session data, routing tables, and pipeline processing including updating packet headers, applying quality of service (QoS) policies, and forwarding/transporting the data packets associated with the data sessions, based on the information received from the host module.

Other network elements may be present to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements. For example, many components not specifically shown in FIG. 2 can include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

With respect to FIG. 1B, UPF 102 includes at least a processor 111, a memory 113, a power supply 115, and an FPGA 100. Host server (or "host") 114 is configured to manage data sessions and life cycles associated with data packets that are processed by FPGA 100, and to interface with a control plane network node or gateway. For example, host 114 can receive control-plane instructions from a session management function (SMF), a gateway control plane (SGW-C, PGW-C, or SAEGW-C), or a controller node. Further, host 114 can initiate processes or kernels on configurable logic blocks (CLBs) or modules of the FPGA 100, including interfacing with persistent kernels and communicating information about data packets and sessions between the kernels and other network elements. Each kernel or module can communicate with other kernels, and transfer information to and from other kernels. For example, a packet parsing kernel 104 is configured to receive data packets via interface(s) 109, and parse the packets to obtain session-related information, including various information elements further described herein, and forward the data packets to other kernels, such as session/PDR matching 105, packet processing 106, etc. Session/PDR matching 105 includes logic for matching session information and other information elements parsed by packet parsing kernel 104 and identifying PDRs (or equivalent rules and/or QoS policies) including in order of precedence. Packet processing module 106 can perform various operations including applying rules to data packets traversing the user plane, managing data sessions associated with different rules such as guaranteed bit rate (GBR) and maximum bit rate (MBR) and token buckets associated therewith, synchronizing transmission of data packets and control signals with timers at various operational levels, modify headers, and forward data packets to other network nodes via interface(s) 109.

Further, interface(s) 109 can include one or more ports associated with different reference points, or configured to communicate with different network nodes or devices, e.g., one or more gateways or functions on the core network, or any other network node on the PDN, including but not limited to application servers, session management, proxy, web server, media server, or end-user wireless devices coupled to another wireless network or RAN. For example, interfaces 209 can include a first set of ports associated with reference points for data transmission between different network nodes, and a second set of ports associated with reference points for control signal transmission between different network nodes.

Further, data packets can be any type of data packet that is originated from a source node and destined to a destination node. For example, the data packet can include a data packet associated with a data session on a user plane, or a control data packet, and can be received from any type of network node, including an access node, controller node, gateway, external network node, virtual private network (VPN) node, and so on. As described herein, the data packet can be received via one or more different ports, interfaces, or reference points configured on the programmable networking device. For example, interface(s) 109 include at least a port associated with the N3 reference point, which is used as a data input or output between the programmable networking device and a radio access network or access node within the radio access network. In an embodiment, a programmable networking device includes at least a port associated with the N6 reference point, which is used as a data input or output between the programmable networking device and a packet data network (PDN). In an embodiment, a programmable networking device includes at least a port associated with the N9 reference point, which is used as a data input or output between the programmable networking device and another programmable networking device, such as an intermediate UPF (iUPF) in 5G networks. Further, in an embodiment, a programmable networking device 130 includes at least a port associated with a control signal reference point, such as the N4 reference point, which is used as an input for control signals. For example, as described herein, a management module in a programmable networking device is configured to receive session information from a control gateway (SGW-C or PGW-C) or session management function (SMF), via the port associated with the N4 reference point. The control information received via the N4 reference point includes information related to provisioning a new session (e.g., using the packet forwarding control protocol (PFCP), quality of service information, billing information (including how and when to generate billing records), unique identifiers for a session, and so on. In an embodiment, information received via the N4 reference point enables the programmable networking device to perform session life cycle management. In an exemplary embodiment, in 4G networks, the port is associated with a S1-U or S5/S8-U interface or reference point.

Further as described above, different types of data packets and sessions necessitate varying levels and types of PDRs, QoS. Therefore, UPF 102 can be configured to efficiently process data packets (e.g., user plane data packets) by providing targeted rapid lookups of processing rules (e.g., PDRs) without assessing too many PDRs during the process. For example, a method performed by UPF 102 (and/or logic modules provided on FPGA 100 in any combination) can include receiving a data packet via a first interface, based on an identifier of the first interface, identifying a session associated with the data packet, identifying one or more packet data rules (PDRs) associated with the session, and processing the data packet per the PDRs with the highest precedence. The method further includes identifying the first interface by parsing the data packet for metadata information. The metadata can include one or more of a source and destination MAC address, a C-tag or S-tag next to the MAC address, an outbound EtherType, source and destination IP addresses, a protocol type, and so on. For a user datagram protocol (UDP), the metadata can include source and destination port, and in case the port is a GTP-U port, a TEID, QoS flow identifier (QFI), inner EtherType, an application identifier (ID) for protocol HTTP, and so on. The session associated with the data packet is identified via a rapid lookup or a hash table lookup. The hash table lookup comprises calculating a hash value. In the case of a collision, a parallel hash table lookup is performed on FPGA 100. Further, the rapid lookup comprises identifying the session based on one or more information elements (IEs) including the metadata listed above. Based on the parsed metadata/IEs, it can be determined that the first interface comprises an N6 interface when the one or more IEs comprises a destination internet protocol (IP) address. It can further be determined that the first interface comprises a GPRS tunneling protocol (GTP) interface; and the one or more IEs comprises one or more of a tunnel endpoint identifier (TEID) or a fully-qualified tunnel endpoint identifier (FTEID). Determining that the first interface comprises the GTP interface is based on determining that the data packet is received via one or more of a N3 or N9 interface.

As described herein, upon identifying the data session as described above, at least one of the PDRs associated with the session are used to process the data packet. The a least one PDR can be applied based on a highest-precedence of the PDR. It can be determined that the data packet is addressed to a second network, and the data packet routed to the second network via one or more interfaces 109. For example, the data packet can be routed to the second network via an N6 interface. Further the data packet can be routed to a second FPGA on the second network via an N9 interface. Further, the data packets may be associated with one or more specific interfaces as a condition to securing the data packets using the IPsec protocol. The one or more specific interfaces include one or more of an N3 interface, an N6 interface, or an N9 interface. For example, the data packets can be associated with data sessions transmitted to or from one or more of a radio access network (RAN), a packet data network (PDN), or a second FPGA, each of which communicates with the UPF 102 via the N3, N6, or N9 interfaces respectively from among interfaces 109.

Figure 2:
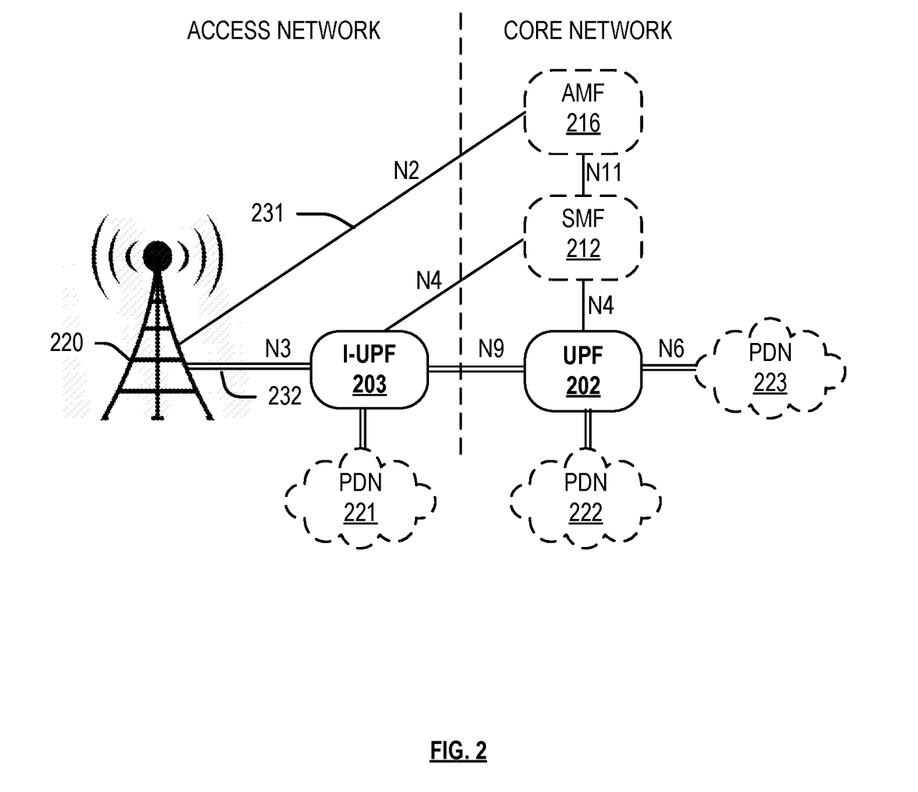
FIG. 2 depicts an example system for control and user plane separation (CUPS).

FIG. 2 shows an exemplary system for control and user plane separation (CUPS). The components illustrated here include at least an access node 220, which can include a gNodeB as described above with reference to RAN 120. Further, the UPFs 202 and 203 can be similar to the UPF 102. For example, UPFs 202/203 can include a processor, a memory, and a FPGA or equivalent device that is configured to perform the various packet processing functions described herein. Such a programmable networking device may comprise multiple hardware circuits and software modules associated with the different types of functions, all of which are incorporated into a single hardware unit, such as a rack-mountable unit. One or more host modules in each of UPF 202, 203 can interface between an FPGA programmed with and other network elements, such as a control plane network node or gateway. Further, one or more software-based network interfaces (softMAC) embedded on the FPGA can be configured to securely convey data packets to and from the one or more host modules, thereby securing the data packets from network elements external to the FPGA or the programmable networking device itself.

For the purposes of this embodiment, data packets associated with data sessions, e.g. payload, etc., traverse user plane 232, while data packets associated with control signals (to manage the data sessions) are transmitted via the control plane 231. For example, an access and mobility function (AMF) 216 can receive connection requests from one or more wireless devices via access node 220, and manage tasks associated with connection or mobility management, while forwarding session management requirements over an N11 interface to a session management function (SMF) 212. Meanwhile, the SMF 212 is primarily responsible for interacting with the decoupled user plane 232, creating updating and removing Protocol Data Unit (PDU) sessions and managing session context with UPF 202. The UPFs 202, 203 can be positioned or located at various points within a network topology depending on a network operator's requirement. As described herein, UPFs 202, 203 can enhance or replace the myriad existing packet gateways, such as a CUPS based user plane S-GW, P-GW, or SAE-GW in 4G networks, and user plane functions in 5G networks. Further, intermediate UPF (iUPF) 203 can perform packet filtration at network edge of the access network and packet data network 221. For example, packet data network 221 can be a private network requiring deep-packet inspection (DPI) for packets traversing thereto/therefrom, or secure fast transfer of transmitting detailed instructions (for high-frequency stock trading, for example), and so on. Thus, iUPF 203 can be co-located with access node 220, such that data flows may directly egress from the user plane at the radio access network (RAN) to the destination packet data network 221. This eliminates having to transport the data packets to central sites or networks, while providing robust and secure filtration of network edge of packet data network 221.

Further, each UPF 202/203 can include one or more ports that are associated with different reference points, including a first set of ports associated with reference points for data transmission between different network nodes, and a second set of ports associated with reference points for control signal transmission between different network nodes. This can include at least a port associated with the N3 reference point, which for example is used as a data input or output between the UPF 203 and access node 220. Further, a port associated with the N6 reference point is used as a data input or output between the UPFs 202, 203 and PDNs 221, 222, 223 respectively. Further, at least a port associated with the N9 reference point is used as a data input or output between UPF 202 and UPF 203, and other programmable networking devices not shown herein. Further, at least a port associated with a control signal reference point, such as the N4 reference point, is used as an input for control signals via control plane 231. For example, as described herein, a server or host module in UPF 202/203 is configured to receive session information from SMF 212, via the port associated with the N4 reference point. The control information received via the N4 reference point includes information related to provisioning a new session, such as using the packet forwarding control protocol (PFCP), quality of service information, billing information (including how and when to generate billing records), unique identifiers for a session, and so on.

Figure 3:
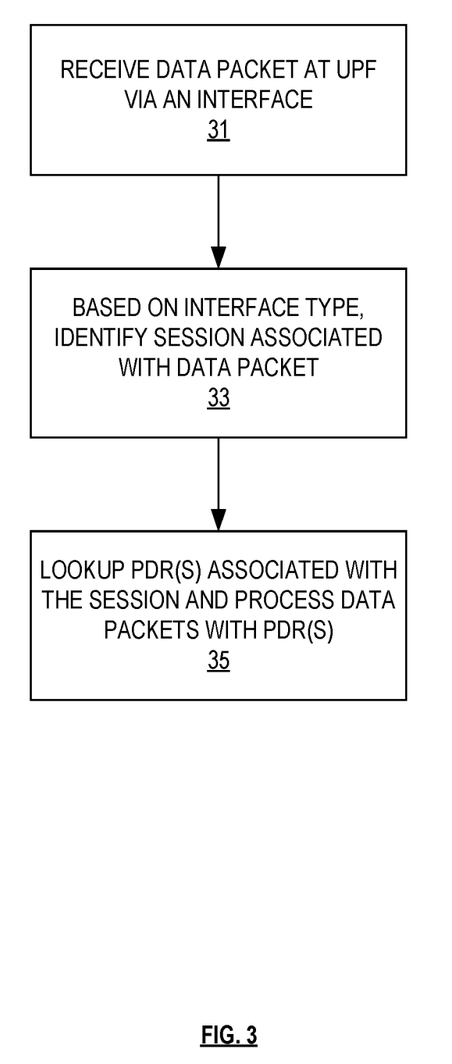
FIG. 3 depicts an example method for processing user-plane data packets.

FIG. 3 depicts an example method for processing user-plane data packets. The operations of FIG. 3 may be performed by one or more FPGAs coupled to a host module, similar to UPFs 102, 202. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 31, a data packet is received at an FPGA component of the UPF. The data packet may include any type of data packet that is originated from a source node and destined to a destination node. For example, the data packet can include a data packet associated with a data session on a user plane, or a control data packet, and can be received from any type of network node, including an access node, controller node, gateway, external network node, virtual private network (VPN) node, and so on. As described herein, the data packet can be received via one or more different ports, interfaces, or reference points configured on the programmable networking device.

At 33, based on the type of interface via which the packet was received, a session is identified for the data packet. The interface can be identified by parsing the packet. For example, an index-type lookup can be used to parse any metadata information, which can enable a lookup of a session and its associated PDRs. For example, the metadata information can include different information elements that are also correlated with the different interfaces via with the data packets are received. The hash table type enables handling millions of entries associated with, for example, the different PFCP sessions. One particular example includes calculating the hash (an index into an array) which provides direct access with no overhead. For example, in the instance of a collision (i.e., a hash value appears more than once), the lookup and matching operations can be performed in parallel at an FPGA coupled to the UPF, to further optimize the overall process. The metadata can include one or more of a source and destination MAC address, a C-tag or S-tag next to the MAC address, an outbound EtherType, source and destination IP addresses, a protocol type, and so on. For a user datagram protocol (UDP), the metadata can include source and destination port, and in case the port is a GTP-U port, a TED, QoS flow identifier (QFI), inner EtherType, an application identifier (ID) for protocol HTTP, and so on. The session associated with the data packet is identified via a rapid lookup or a hash table lookup.

At 35, rules (e.g., PDRs, QoS rules, etc.) associated with the data session are looked up, and the data packet processed based on the rule with the highest precedence. For example, retrieved PDRs can be arranged or listed in highest precedence with PDRs in decreasing order of precedence. The packet can then be processed (i.e., rules applied in order of precedence) more efficiently than evaluating all PDRs stored on the network node. The rapid identification of the session combined with precedence-based application of the PDR associated with the identified session (associated with the particular port/interface) minimizes the need for processing other attributes associated with packets from that session. If it is assumed that the interface type is known or identified (e.g., N6, GTP—N3/N9), and that all packets are under consideration for processing, then no further attributes need to be parsed, since multiple interfaces (e.g., N6 & N3) could reside on the same physical port. Thus, all the traffic traversing the physical port is processed without distinction. In an example, upon identifying that the packet is received via an N6 interface, the destination IP address is referred to identify the session associated therewith. These destination IP addresses can include those of wireless devices (e.g., UEs) subscribing to the wireless network via radio access networks (RANs). Further if the interface is a GTP interface, a TEID and/or FTEID is referred, without the need to lookup an IP address.

Figure 4A:
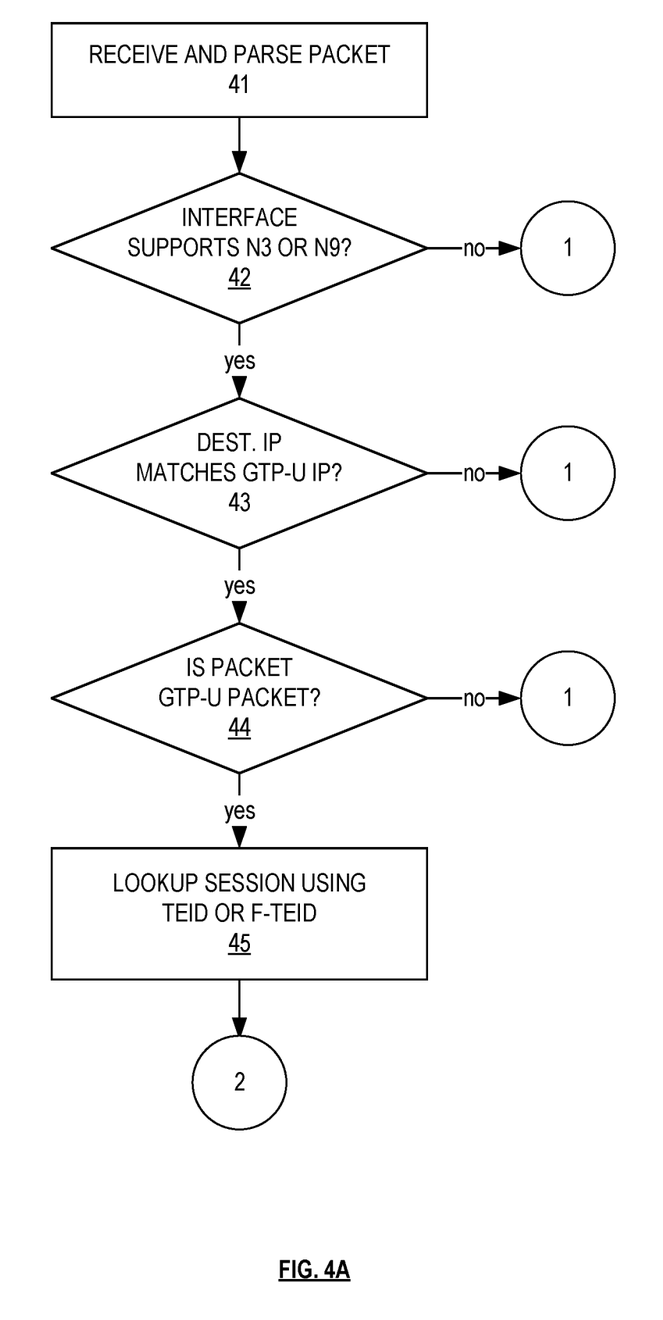
FIGS. 4A-4C depict another example method for processing user-plane data packets.
Figure 4B:
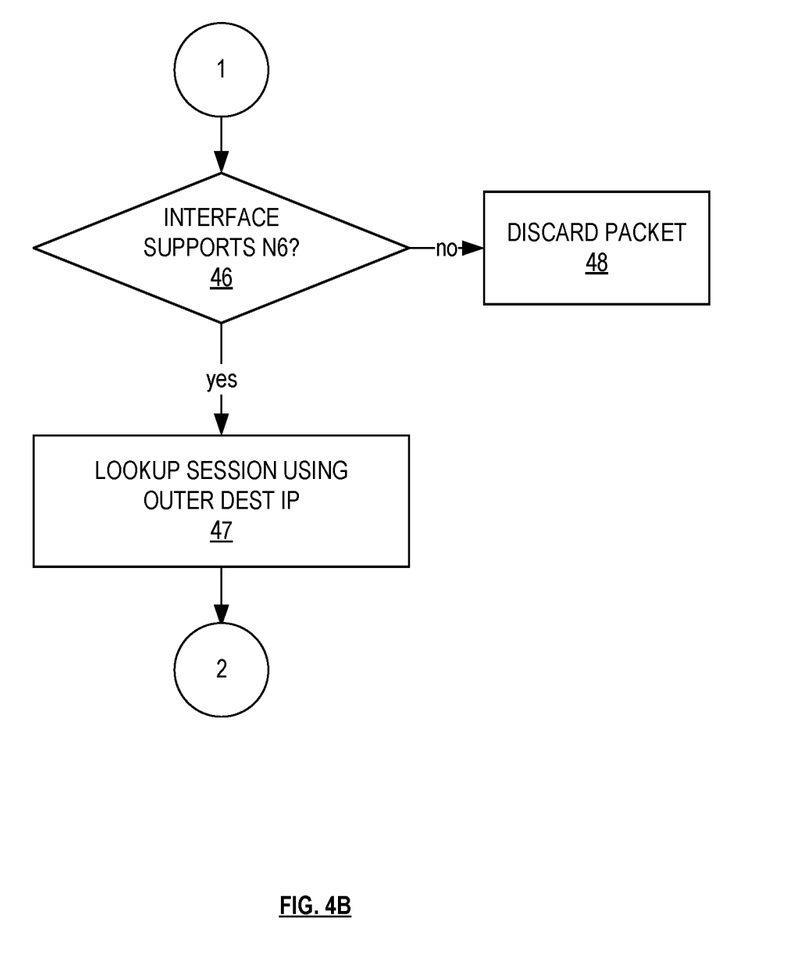
Figure 4C:
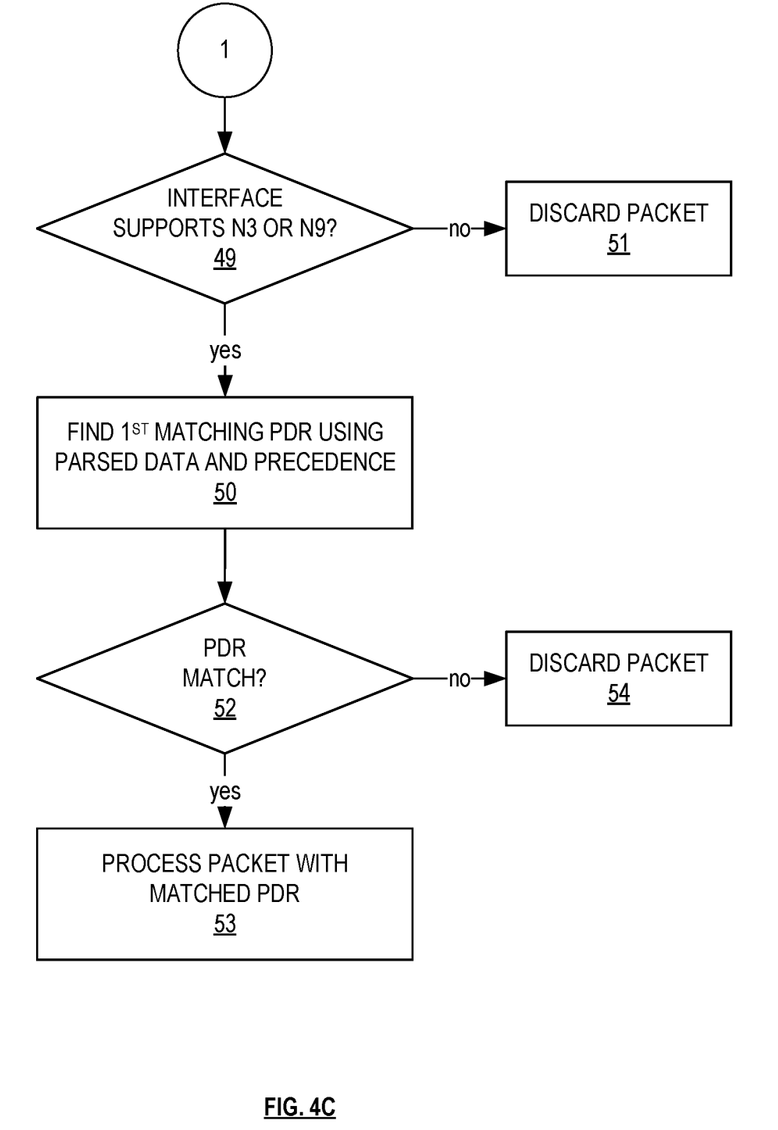

FIGS. 4A-4C illustrate a method for processing user plane data packets. The operations of FIGS. 4A-4C may be performed by one or more FPGAs coupled to a host module, similar to UPFs 102, 202. Although FIGS. 4A-4C depict steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 41, a packet is received and parsed, according to the operations described above. If it is determined at 42 that the packet is received via an interface (or port) that supports N3 or N9, then at 43 a destination IP address is compared to a GTP-U IP address. If the destination IP address matches the GTP-U IP address, then at 44, it is determined whether or not the packet is GTP-U data packet, upon which the session is identified based on a TEID or F-TEID at 45, and the method continues to the operations method described in FIG. 4C. However, if it is determined that the interface does not support N3 or N9 at 42, or if the destination IP address does not match the GTP-U IP address at 43, or the packet is not a GTP-U packet, then the method continues to the operations described in FIG. 4B.

With reference now to FIG. 4B, at 46 it is determined whether or not the interface supports N6, and if it does, the session is identified by looking up an outer destination IP address, and the method continues on to the operations described in FIG. 4C. Whereas, if the interface does not support N6, then at 48 the packet is discarded. Meanwhile, with reference to FIG. 4C, at 49 it is determined if the interface supports N3 or N9, and if it does, a first matching PDR is obtained for the session based on precedence. If at 49 it is determined that the interface does not support N3 or N9, the packet is discarded at 51. However, at 52, if a PDR is found from the matching at step 50, then at 53 the packet is processed with the matched PDR. Whereas, if a PDR is not found, the packet is discarded from these operations.

In light of this disclosure, it will be evident to those having ordinary skill in the art that any specialized circuits including FPGAs, ASICs, and other types of processors can be configured to perform the session identification and packet processing operations described herein. Further, the exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method for processing user-plane data packets, comprising:
   receiving a data packet at a user plane function (UPF) via a first interface;
   identifying the first interface;
   based on the first interface, identifying a session associated with the data packet using a session identification technique including one of a hash table lookup or a rapid lookup;
   identifying one or more packet data rules (PDRs) associated with the session identified using the session identification technique; and
   processing the data packet per one of the PDRs having a highest precedence.

2. The method of claim 1, wherein the one or more PDRs are arranged based on a precedence.

3. The method of claim 1, further comprising identifying the first interface by parsing the data packet for metadata information.

4. The method of claim 1, wherein the session is a packet forwarding control protocol (PCFP) session.

5. The method of claim 1, wherein the hash table lookup comprises calculating a hash value.

6. The method of claim 5, wherein in case of a collision, a parallel hash table lookup is performed.

7. The method of claim 1, wherein the rapid lookup comprises identifying the session based on one or more information elements (IEs).

8. The method of claim 7, further comprising determining that the first interface comprises an N6 interface; and the one or more IEs comprises a destination internet protocol (IP) address.

9. The method of claim 7, further comprising determining that the first interface comprises a general packet radio services (GPRS) tunneling protocol (GTP) interface; and the one or more IEs comprises one or more of a tunnel endpoint identifier (TEID) or a fully-qualified tunnel endpoint identifier (FTEID).

10. The method of claim 9, wherein determining that the first interface comprises the GTP interface is based on determining that the data packet is received via one or more of a N3 or N9 interface.

11. A programmable networking device for processing user-plane data packets, the programmable network device comprising:
   a field programmable gate array (FPGA); and
   one or more configurable logic blocks (CLBs) on the FPGA, the one or more CLBs programmed to perform operations comprising:
      receiving a data packet via a first interface coupled to the FPGA;
      identifying the first interface;
      based on the first interface, identifying a session associated with the data packet using a session identification technique including one of a hash table lookup or a rapid lookup;

identifying one or more packet data rules (PDRs) associated with the session identified using the session identification technique; and processing the data packet per a PDR one PDRs having a highest precedence.

12. The programmable networking device of claim 11, wherein the one or more PDRs are arranged based on a precedence.

13. The programmable networking device of claim 11, wherein the operations further comprise identifying the first interface by parsing the data packet for metadata information.

14. The programmable networking device of claim 11, wherein the session is a packet forwarding control protocol (PCFP) session.

15. The programmable networking device of claim 11, wherein the hash table lookup comprises calculating a hash value.

16. The programmable networking device of claim 15, wherein in case of a collision, a parallel hash table lookup is performed.

17. The programmable networking device of claim 11, wherein the rapid lookup comprises identifying the session based on one or more information elements (IEs).

18. The programmable networking device of claim 17, further comprising determining that the first interface comprises an N6 interface; and the one or more IEs comprises a destination internet protocol (IP) address.

19. The programmable networking device of claim 17, further comprising determining that the first interface comprises a general packet radio services (GPRS) tunneling protocol (GTP) interface; and the one or more IEs comprises one or more of a tunnel endpoint identifier (TEID) or a fully-qualified tunnel endpoint identifier (FTEID).

20. The programmable networking device of claim 19, wherein determining that the first interface comprises the GTP interface is based on determining that the data packet is received via one or more of a N3 or N9 interface.

\* \* \* \* \*